United States Patent
Watanabe

(10) Patent No.: US 10,992,188 B2
(45) Date of Patent: Apr. 27, 2021

(54) WIRELESS POWER TRANSMITTER

(71) Applicant: ROHM CO., LTD., Kyoto (JP)

(72) Inventor: Masatoshi Watanabe, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 229 days.

(21) Appl. No.: 16/194,845

(22) Filed: Nov. 19, 2018

(65) Prior Publication Data

US 2019/0157914 A1    May 23, 2019

(30) Foreign Application Priority Data

Nov. 21, 2017  (JP) .............................. JP2017-223658

(51) Int. Cl.
*H02J 50/60* (2016.01)
*H02J 7/02* (2016.01)
*H01F 38/14* (2006.01)
*H02J 50/12* (2016.01)

(52) U.S. Cl.
CPC .............. *H02J 50/60* (2016.02); *H01F 38/14* (2013.01); *H02J 7/025* (2013.01); *H02J 50/12* (2016.02)

(58) Field of Classification Search
None
See application file for complete search history.

(56) References Cited

U.S. PATENT DOCUMENTS

| | | | |
|---|---|---|---|
| 2017/0141604 A1* | 5/2017 | Park | B60L 53/124 |
| 2017/0288412 A1* | 10/2017 | Yamamoto | H02J 50/70 |
| 2017/0310119 A1* | 10/2017 | Taylor | H01F 38/14 |
| 2019/0157914 A1* | 5/2019 | Watanabe | H02J 50/12 |

FOREIGN PATENT DOCUMENTS

| | | |
|---|---|---|
| JP | 5071574 B | 11/2012 |
| JP | 2013038854 A | 2/2013 |
| JP | 2016163493 A | 9/2016 |

\* cited by examiner

*Primary Examiner* — Jared Fureman
*Assistant Examiner* — Aqeel H Bukhari
(74) *Attorney, Agent, or Firm* — Cantor Colburn LLP

(57) ABSTRACT

A transmission antenna includes a resonant capacitor and a transmitter coil coupled in series. The driver includes a bridge circuit structured to apply a driving voltage to the transmission antenna. A current sensor detects current $I_S$ flowing through the bridge circuit. A foreign object detector detects the current $I_S$ flowing through the bridge circuit while changing switching frequency of the bridge circuit and determines whether a foreign matter is present or absent based on a difference between two frequencies $f_H$ and $f_L$ giving current lower than a peak by a predetermined ratio.

20 Claims, 9 Drawing Sheets

WIRELESS POWER TRANSMITTER

CROSS-REFERENCE TO RELATED APPLICATION(S)

The present application claims priority under 35 U.S.C § 119(e) to Japanese Patent Application No. 2017-223658, filed on Nov. 21, 2017, the entire contents of which are incorporated herein by reference.

BACKGROUND OF THE INVENTION

1. Field of the Invention

The present invention relates to a wireless power supply technique, and more particularly to foreign object detection.

2. Description of the Related Art

In recent years, wireless power supply to electronic devices has begun to spread. Wireless Power Consortium (WPC) was organized to promote mutual use among products of different manufacturers, and the Qi standard, which is the international standard, was formulated by WPC.

Wireless power supply based on the Qi standard utilizes electromagnetic induction between the transmitter coil and the receiver coil. A power supply system includes a power supply apparatus having a transmitter coil and a power receiving terminal having a receiver coil.

FIG. 1 is a diagram illustrating a configuration of a wireless power supply system 10 conforming to the Qi standard. The power supply system 10 includes a power transmitter 20 (TX) and a power receiver 30 (RX). The power receiver 30 may be mounted on an electronic device such as a mobile phone terminal, a smartphone, an audio player, a game device, a tablet terminal, and the like.

The power transmitter 20 includes a transmitter coil (primary coil) 22, a driver 24, a controller 26, and a demodulator 28. The driver 24 includes an H bridge circuit (full bridge circuit) or a half bridge circuit, applies a driving signal S1, more specifically a pulse signal to the transmitter coil 22 to cause driving electric current to flow through the transmitter coil 22 so that the transmitter coil 22 generates a power signal S2 of electromagnetic field. The controller 26 comprehensively controls the entire power transmitter 20, and specifically changes the transmission power by controlling the switching frequency of the driver 24 or the duty ratio of the switching.

In the Qi standard, a communication protocol is defined between the power transmitter 20 and the power receiver 30, and information can be transmitted as a control signal S3 from the power receiver 30 to the power transmitter 20. The control signal S3 is transmitted from a receiver coil 32 (secondary coil) to the transmitter coil 22 in an Amplitude Modulation (AM)-modulated form by using backscatter modulation. The control signal S3 includes, for example, power control data (also referred to as a packet) for controlling the power supply amount to the power receiver 30, and data indicating information unique to the power receiver 30. The demodulator 28 demodulates the control signal S3 included in the current or voltage of the transmitter coil 22. The controller 26 controls the driver 24 based on the power control data included in the demodulated control signal S3.

The power receiver 30 includes the receiver coil 32, a rectifying circuit 34, a smoothing capacitor 36, a modulator 38, a load 40, a controller 42, and a power supply circuit 44. The receiver coil 32 receives the power signal S2 from the transmitter coil 22 and transmits the control signal S3 to the transmitter coil 22. The rectifying circuit 34 and the smoothing capacitor 36 rectify and smooth current S4 induced in the receiver coil 32 in response to the power signal S2, and convert the rectified and smoothed current into DC (direct current) voltage.

The power supply circuit 44 charges a secondary battery (not illustrated) by using electric power supplied from the power transmitter 20 or steps up or steps down DC voltage $V_{RECT}$, and supplies the voltage to the controller 42 or the other load 40.

The controller 42 monitors the power supplied to the load 40 and generates power control data for controlling the power supply amount from the power transmitter 20 according to the monitored power. The modulator 38 modulates the control signal S3 including the power control data and modulates the coil current of the receiver coil 32, thereby modulating the coil current and the coil voltage of the transmitter coil 22.

In the power supply system 10, the power transmitter 20 and the power receiving terminal (electronic device) are disposed in a relatively free space. Thus, a state where a conductive foreign object such as a metal piece or the like is disposed between the transmitter coil 22 and the receiver coil 32 or in the vicinity thereof may occur. When the wireless power supply is performed in this state, current flows through the foreign object, and power loss occurs. Further, there may be a problem that the foreign object generates heat. In view of this situation, Foreign Object Detection (FOD) was formulated in System Description Wireless Power Transfer Volume I: Low Power Part 1: Interface Definition Version 1.1 (WPC 1.1) specification.

According to this FOD, the power transmitted by the power transmitter 200 and the power received by the power receiver 300 are compared with each other, and when there is a difference exceeding an allowable value between them, it is determined that a foreign object exists.

Currently, the development of the Qi standard for medium power (Power Class 0 Extended Power Profile) is being formulated, and another FOD method is being sought. One of them utilizes the Q value of the transmitter coil (antenna). Specifically, when a foreign object comes close to the transmitter coil, the Q value of the transmission antenna changes. The fact is utilized to allow determination of presence or absence of a foreign object.

SUMMARY OF THE INVENTION

The present invention has been made in view of the above problems, and one of exemplary purposes of an embodiment is to provide a power transmitter capable of detecting a foreign object.

One embodiment of the present invention relates to a wireless power transmitter that transmits a power signal to a wireless power receiver. A wireless power transmitter includes a transmission antenna including a resonant capacitor and a transmitter coil coupled in series, a driver including a bridge circuit structured to apply a driving voltage to the transmission antenna, a current sensor structured to detect a current flowing through the bridge circuit, and a foreign object detector structured to detect the current flowing through the bridge circuit while changing switching frequency of the bridge circuit and determine whether a foreign object is present or absent based on a difference between two frequencies $f_H$ and $f_L$ giving current lower than a peak by a predetermined ratio.

Another embodiment of the present invention relates to a charger. The charger includes any of the wireless power transmitters described above.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
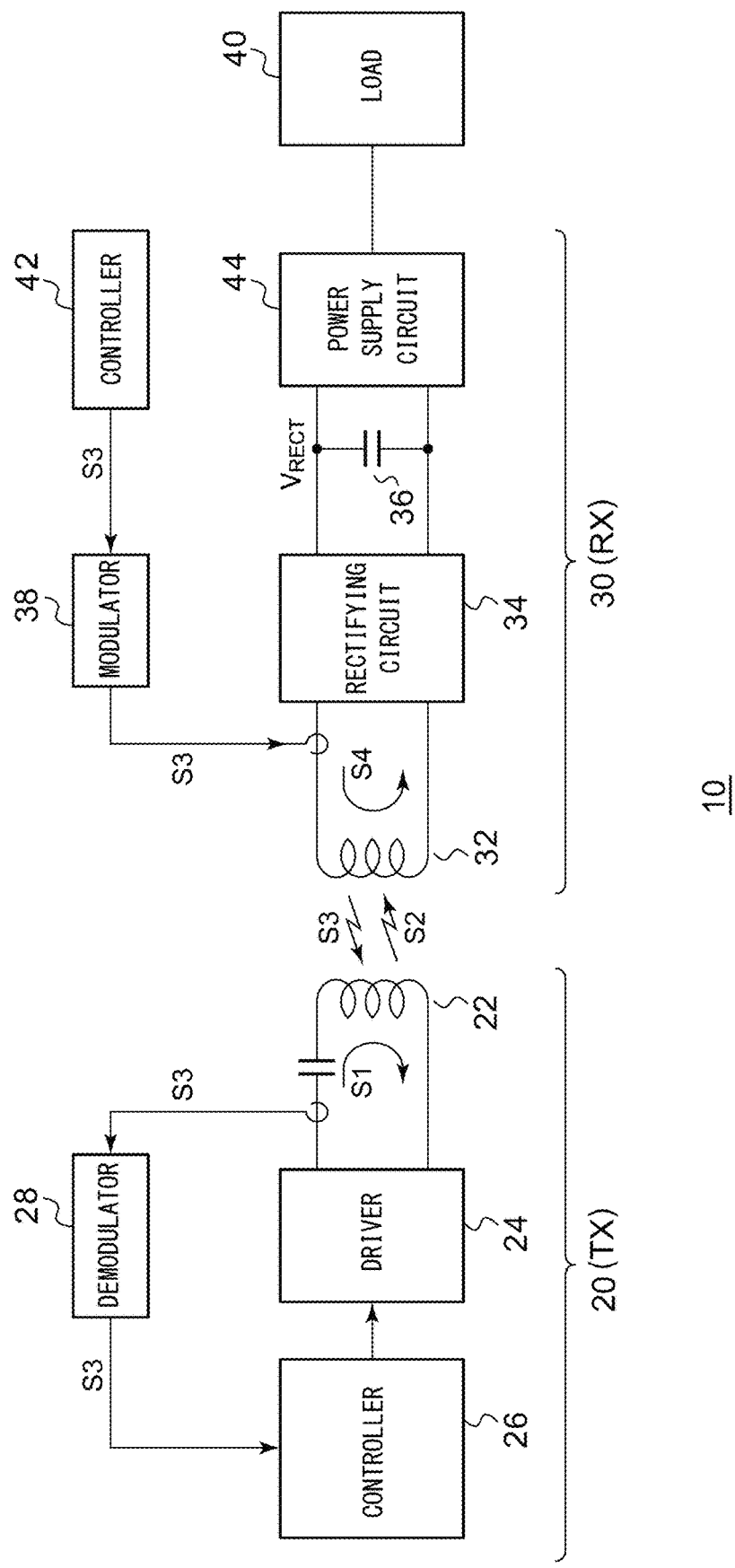
FIG. 1 is a diagram illustrating a configuration of a wireless power supply system conforming to the Qi standard.

The invention will now be described based on preferred embodiments which do not intend to limit the scope of the present invention but exemplify the invention. All of the features and the combinations thereof described in the embodiment are not necessarily essential to the invention.

Overview of Embodiment

In one embodiment of the present specification, a wireless power transmitter is disclosed. A wireless power transmitter includes a transmission antenna including a resonant capacitor and a transmitter coil coupled in series, a driver including a bridge circuit structured to apply a driving voltage to the transmission antenna, a current sensor structured to detect a current flowing through the bridge circuit, and a foreign object detector structured to detect the current flowing through the bridge circuit while changing switching frequency of the bridge circuit and determine whether a foreign object is present or absent based on a difference between two frequencies $f_H$ and $f_L$ giving current lower than a peak by a predetermined ratio.

Since the dependency of the current flowing through the bridge circuit on the switching frequency (simply referred to as frequency characteristic) changes depending on the situations around the transmission antenna. The dependency is, for example, the center frequency and the bandwidth that give the peak. Thus, a foreign object can be detected by detecting the frequency characteristic of the current flowing through the bridge circuit. Here, the frequency characteristic of the current is not necessarily symmetrical with respect to the center frequency, but rather it may be asymmetrical in some cases. According to this embodiment, by acquiring the difference between the two frequencies $f_H$ and $f_L$, the asymmetry of the frequency characteristics can be taken into consideration, and the accuracy of foreign object detection can be improved.

The foreign object detector may (i) acquire frequency $f_0$ at which the current peaks and the current value $I_{MAX}$ at that time while sweeping up the switching frequency of the bridge circuit from a frequency lower than the resonance frequency of the transmission antenna as a starting point, (ii) calculate the current $I_{LOW}$ by multiplying the current value $I_{MAX}$ by a predetermined ratio, and (iii) acquire the frequency $f_H$ when the detected current reaches the current $I_{LOW}$ while further sweeping up the switching frequency. The foreign object detector may then (iv) acquire the frequency $f_L$ at which the detected current reaches the current $I_{LOW}$ while sweeping down the switching frequency.

The foreign object detector may (i) acquire frequency $f_0$ at which the current peaks and the current value $I_{MAX}$ at that time while sweeping down the switching frequency of the bridge circuit from a frequency higher than the resonance frequency of the transmission antenna as a starting point, (ii) calculate the current $I_{LOW}$ by multiplying the current value $I_{MAX}$ by a predetermined ratio, and (iii) acquire the frequency $f_L$ when the detected current reaches the current $I_{LOW}$ while further sweeping down the switching frequency. The foreign object detector may then (iv) acquire the frequency $f_H$ when the detected current reaches the current $I_{LOW}$ while sweeping up the switching frequency.

The predetermined ratio may be $1/\sqrt{2}$.

The foreign object detector may calculate the Q value according to $Q=f_0/(f_H-f_L)$, and determine whether a foreign object is present or absent based on the comparison result between the calculated Q value and a predetermined threshold value.

The foreign object detector may receive the threshold value from the wireless power receiver.

The current sensor may detect the current flowing into an upper power supply terminal of the bridge circuit from the DC power supply. In this case, the current can be measured as a signal that approximates a DC signal. Thus, accuracy can be improved. This effect is remarkable especially when a smoothing capacitor is coupled to the upper power supply terminal of the bridge circuit.

The current sensor may detect the current flowing out to the ground from a lower power supply terminal of the bridge circuit. In this case, the current can be measured as a signal that approximates a DC signal. Thus, accuracy can be improved.

The current sensor may include a detection resistor provided on the path of current to be detected, a sense amplifier that amplifies voltage drop across the detection resistor, a low-pass filter that receives the output of the sense amplifier, and an A/D converter that converts the output of the low-pass filter to a digital value.

The current sensor may also be used as a current detection circuit that detects current necessary for calculating transmission power. In this case, additional hardware can be further reduced.

Embodiment

Hereinafter, the present invention will be described with reference to the drawings based on a preferred embodiment. Identical or equivalent components, members, and processes illustrated in the drawings are denoted by the same reference signs, and redundant description will not be provided as appropriate. In addition, the embodiment does not limit the invention but is an example, and all the features and combinations thereof described in the embodiment are not necessarily essential to the invention.

In the present specification, "a state where a member A is coupled to a member B" may mean a case where the member A and the member B are physically and directly coupled to each other, and also mean a case where the members are indirectly coupled to each other via another member that does not substantially affect the connection state of the members, or that does not impair the function or effect exerted from the connection.

Similarly, "a state where a member C is disposed between a member A and a member B" may mean a case where the member A and the member C or the member B and the member C are directly coupled to each other, and also mean a case where the members are indirectly coupled to each other via another member that does not substantially affect the connection state of the members, or that does not impair the function or effect exerted from the connection.

Figure 2:
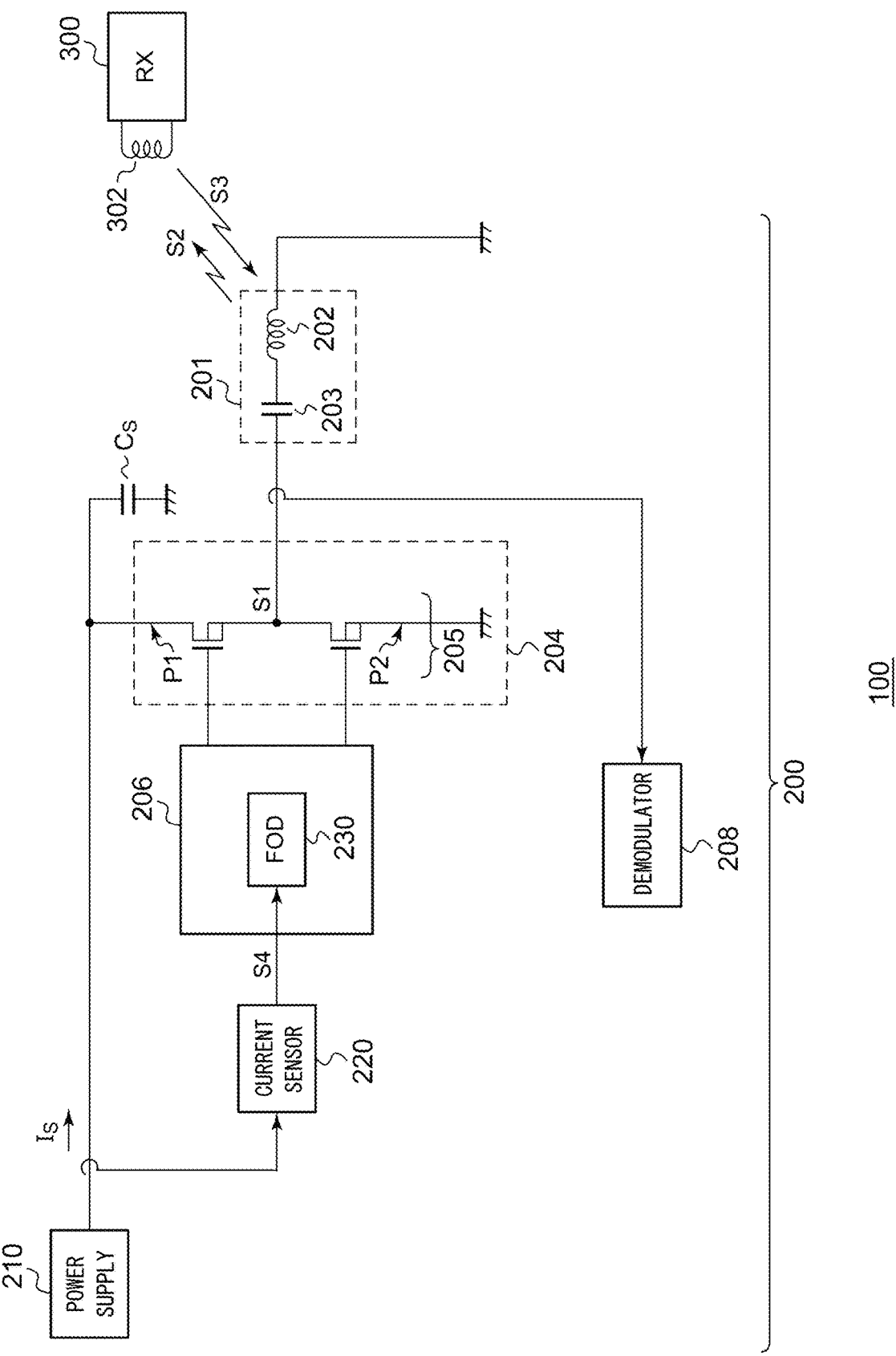
FIG. 2 is a block diagram of a power supply system including a wireless power transmitter according to an embodiment.

FIG. 2 is a block diagram of a power supply system 100 including a wireless power transmitter according to an embodiment. The power supply system 100 includes a power transmitter 200 (TX) and a power receiver 300 (RX). The power receiver 300 may be mounted on an electronic device such as a mobile phone terminal, a smartphone, an audio player, a game device, a tablet terminal, or the like.

The power transmitter 200 may be mounted on a charger having a charging stand, for example. The power transmitter 200 includes a transmitter coil (primary coil) 202, a driver 204, a controller 206, a demodulator 208, a DC power supply 210, and a current sensor 220.

The driver 204 includes an H bridge circuit (full bridge circuit) or a half bridge circuit, and applies a driving signal S1, more specifically a pulse signal, to the transmitter coil 202 to cause driving current to flow through the transmitter coil 202, so that the transmitter coil 202 generates a power signal S2 of electromagnetic field. In the present embodiment, a half bridge circuit 205 is used. The power supply voltage $V_{DD}$ from the DC power supply 210 is supplied to an upper power supply terminal P1 of the half bridge circuit 205, and a lower power supply terminal P2 is grounded. A smoothing capacitor $C_S$ is coupled to the upper power supply terminal P1.

The controller 206 comprehensively controls the entire power transmitter 200, and specifically changes the transmission power by controlling the switching frequency $f_{SW}$ of the driver 204 or the duty ratio of the switching. Since a known technology can be used, the function and configuration of the controller 206 will not be described, except for those related to a foreign object detector 230 to be described below.

In the Qi standard, a communication protocol is defined between the power transmitter 200 and the power receiver 300, and information can be transmitted as a control signal S3 from the power receiver 300 to the power transmitter 200. The control signal S3 is transmitted from a receiver coil 302 (secondary coil) to the transmitter coil 202 in an Amplitude Modulation (AM)-modulated form by utilizing backscatter modulation. The control signal S3 includes, for example, power control data (also referred to as a packet) for controlling the power supply amount to the power receiver 300, and data indicating information unique to the power receiver 300. In addition, the control signal S3 may include a threshold value that defines an appropriate range of the Q value of a transmission antenna 201.

The demodulator 208 demodulates the control signal S3 included in the current or voltage of the transmitter coil 202. The controller 206 controls the driver 204 based on the power control data included in the demodulated control signal S3.

Subsequently, foreign object detection (FOD) in the power transmitter 200 will be described.

Related to FOD, the power transmitter 200 includes the current sensor 220 and the foreign object detector 230 in the controller 206.

The current sensor 220 detects current $I_S$ flowing through the bridge circuit 205 and generates a current detection value S4 indicating the detected current amount. The current detection value S4 is input to the foreign object detector 230 in the controller 206. "Current flowing through the bridge circuit" includes the input current of the bridge circuit or the current flowing to either arm, and does not include the output current, that is, the coil current flowing through the antenna. The input current of the bridge circuit includes current flowing into the upper power supply terminal of the bridge circuit 205 and current flowing out from the lower power supply terminal.

Before power transmission to the power receiver 300 starts, the following foreign object detection processing is executed.

Specifically, the foreign object detector 230 detects the current $I_S$ flowing through the bridge circuit 205 while changing the switching frequency $f_{SW}$ of the bridge circuit 205, and determines whether a foreign object is present or absent based on the detection result. More specifically, the foreign object detector 23 determines whether a foreign object is present or absent based on a difference between the two frequencies $f_H$ and $f_L$ ($f_H$-$f_L$) that gives current lower than a peak by a predetermined ratio.

The basic configuration of the power transmitter 200 has been described. Next, the principle and operation of the foreign object detector 230 will be described.

Figure 3A:
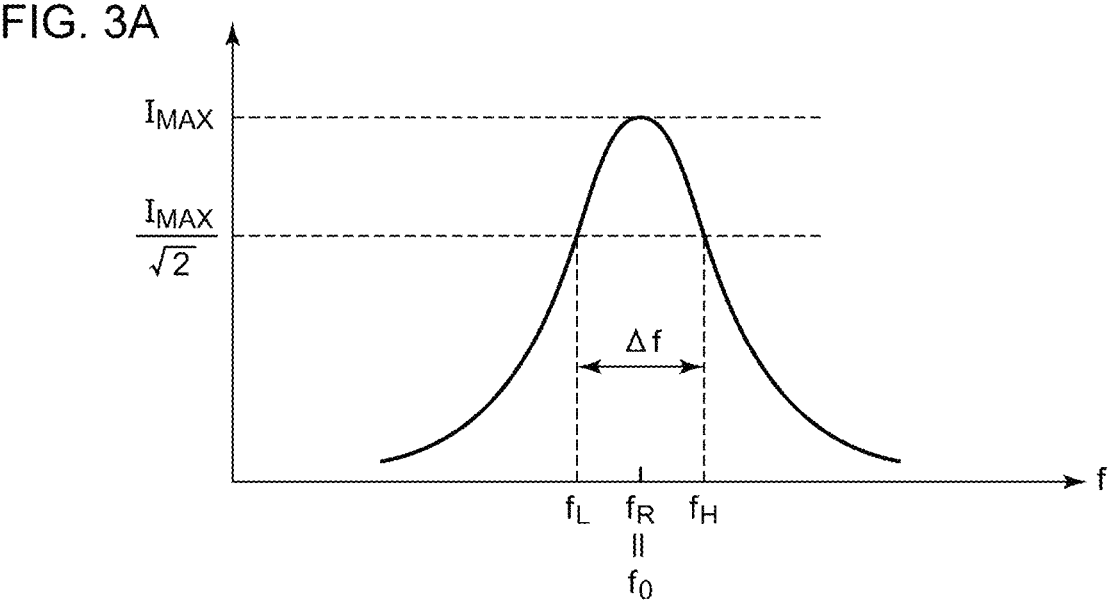
FIG. 3A and FIG. 3B are diagrams illustrating the relationship between switching frequency $f_{SW}$ and current $I_S$ of the bridge circuit.
Figure 3B:
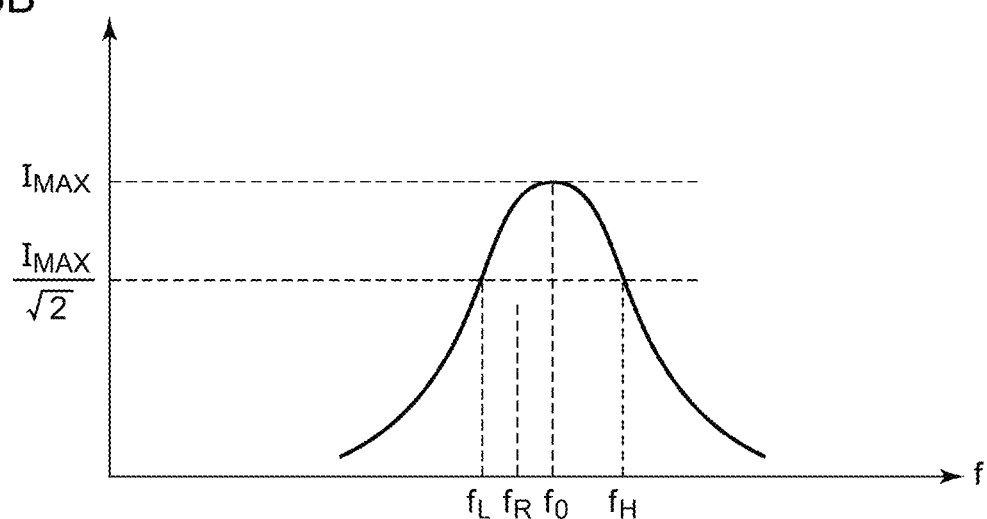

FIG. 3A and FIG. 3B are diagrams illustrating the relationship between the switching frequency $f_{SW}$ and the current $I_S$ of the bridge circuit 205. The inventors of the present invention have examined the dependency of the current $I_S$ flowing through the bridge circuit 205 on the switching frequency (referred to as frequency characteristic) and recognized that, for example, the center frequency $f_0$ and the bandwidth $\Delta f$ that give the peak $I_{MAX}$ changes depending on the situations around the transmission antenna 201. FIG. 3A illustrates an example case where a foreign object such as a metal piece is absent around the transmission antenna 201, and FIG. 3B illustrates an example case where a foreign object is present. The sign $f_R$ indicates the resonance frequency of the transmission antenna 201 alone, and $f_0=f_R$ is satisfied in the absence of foreign object. When a foreign object is present, the frequency giving the peak is shifted from the frequency $f_R$.

The bandwidth $\Delta f$ is a difference between the two switching frequencies $f_H$ and $f_L$ giving an amount of the current $I_S$ that is lower than the peak $I_{MAX}$ by a predetermined ratio and is defined by expression (1).

$$\Delta f = |f_H - f_L| \tag{1}$$

1/≈2, 1/2, 1/e, etc. can be used as the predetermined ratio, but 1/√2 is usually used in the field of telecommunications. A foreign object changes the bandwidth Δf.

The power transmitter 200 of FIG. 2 can detect the frequency characteristic of the current $I_S$ flowing through the bridge circuit 205 using the current sensor 220, and detects a foreign object by monitoring the change in the frequency characteristic.

According to this method, what is required is only measuring the current $I_S$ flowing through the bridge circuit 205. Thus, the circuit configuration of the foreign object detector 230 can be simplified and the cost can be reduced considerably as compared with the conventional configuration.

Further advantages of the power transmitter 200 will be clarified by comparison with a comparative technique. In the comparative technique, only one of the two frequencies $f_H$ and $f_L$ (here assumed to be $f_H$) is detected and the difference from the center frequency $f_0$ giving the current peak is doubled to acquire the bandwidth Δf.

$$\Delta f = 2 \times (f_H - f_0) \quad (2)$$

Figure 4A:
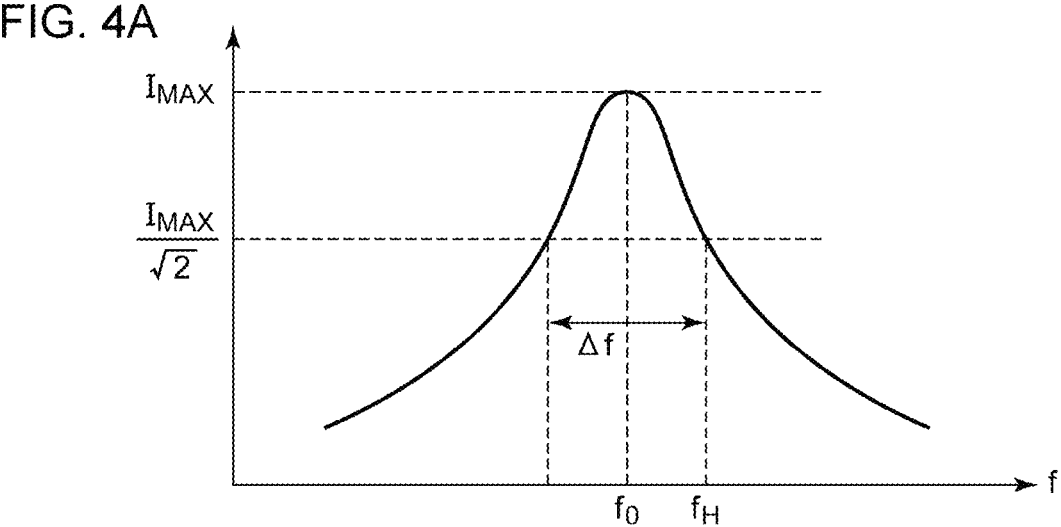
FIG. 4A and FIG. 4B are diagrams for describing measurement of the bandwidth $\Delta f$ in a comparative technique.
Figure 4B:
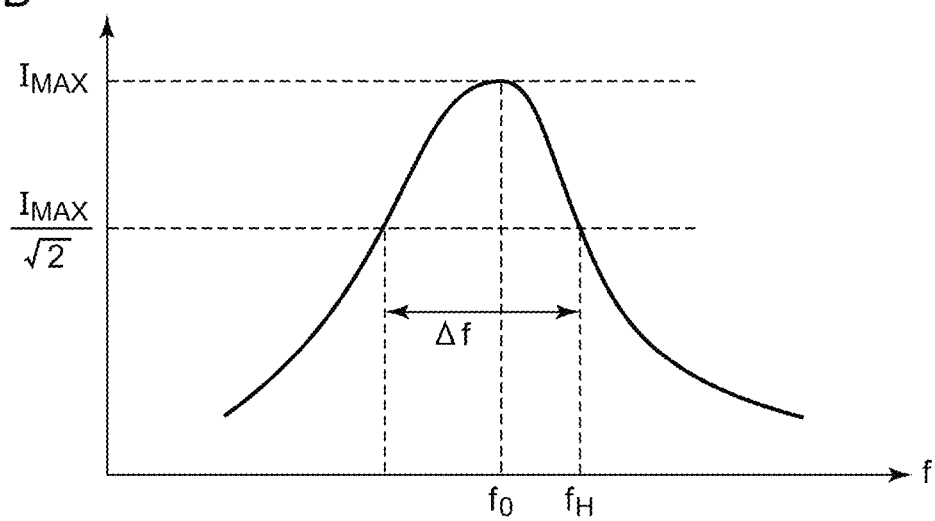

FIG. 4A and FIG. 4B are diagrams for describing the measurement of the bandwidth Δf in the comparative technique. As illustrated in FIG. 4A, when the frequency characteristic of the current is bilaterally symmetrical with respect to the center frequency $f_0$ due to a foreign object, Expression (2) is satisfied. However, when the frequency characteristic of the current is not bilaterally symmetrical as illustrated in FIG. 4B, the bandwidth Δf calculated using Expression (2) does not match the actual bandwidth. This means that a foreign object cannot be detected accurately.

The embodiment is again described. The power transmitter 200 according to the embodiment can detect the bandwidth Δf accurately even when bilateral asymmetry appears in the frequency characteristic of current as illustrated in FIG. 4B, and thus can detect a foreign object accurately.

The power transmitter 200 conforming to the Qi standard may detect a foreign object based on the Q value of the transmission antenna 201.

$$Q = f_0/\Delta f = f_0/(f_H - f_L) \quad (3)$$

Figure 5:
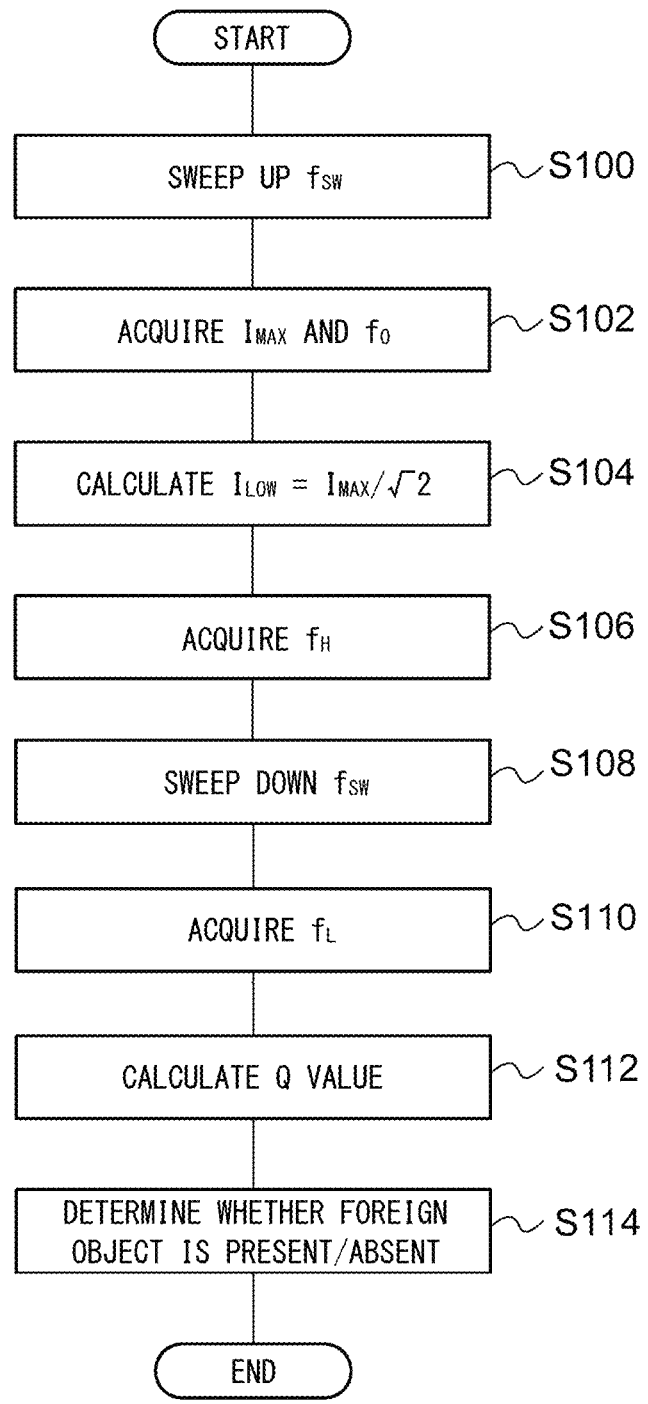
FIG. 5 is a flowchart illustrating an example of a foreign object detection sequence.

FIG. 5 is a flowchart illustrating an example of a foreign object detection sequence. A predetermined frequency $f_S$ lower than the resonance frequency $f_R$ of the transmission antenna 201 is set as a start frequency, and the switching frequency $f_{SW}$ is swept up (S100).

In the sweep up process, the frequency $f_0$ and the current value $I_{MAX}$ at that time are acquired (S102). Subsequently, the current $I_{LOW}$ is calculated by multiplying the peak current value $I_{MAX}$ by the predetermined ratio 1/√2 (S104). While the switching frequency $f_{SW}$ is further swept up, the frequency $f_H$ when the detected current $I_S$ reaches the current $I_{LOW}$ is acquired (S106).

Subsequently, the direction of the frequency sweep is switched to sweep down of the switching frequency $f_{SW}$ (S108). Then, the frequency $f_L$ when the detection current $I_S$ reaches the current $I_{LOW}$ is acquired (S110). Then, the Q value is calculated from the three frequencies $f_0$, $f_H$, and $f_L$ (S112).

The foreign object detector 230 determines whether a foreign object is present or absent based on the Q value thus obtained (S114). More specifically, the foreign object detector 230 can determine whether a foreign object is present or absent based on the comparison result between the calculated Q value and a predetermined threshold value. Here, the foreign object detector 230 may receive the predetermined threshold value from a wireless power receiver. The flow of foreign object detection has been described.

It should be noted that the start frequency of the sweep down (S108) may be $f_H$, $f_0$, or a predetermined value determined independently on those frequencies.

Figure 6:
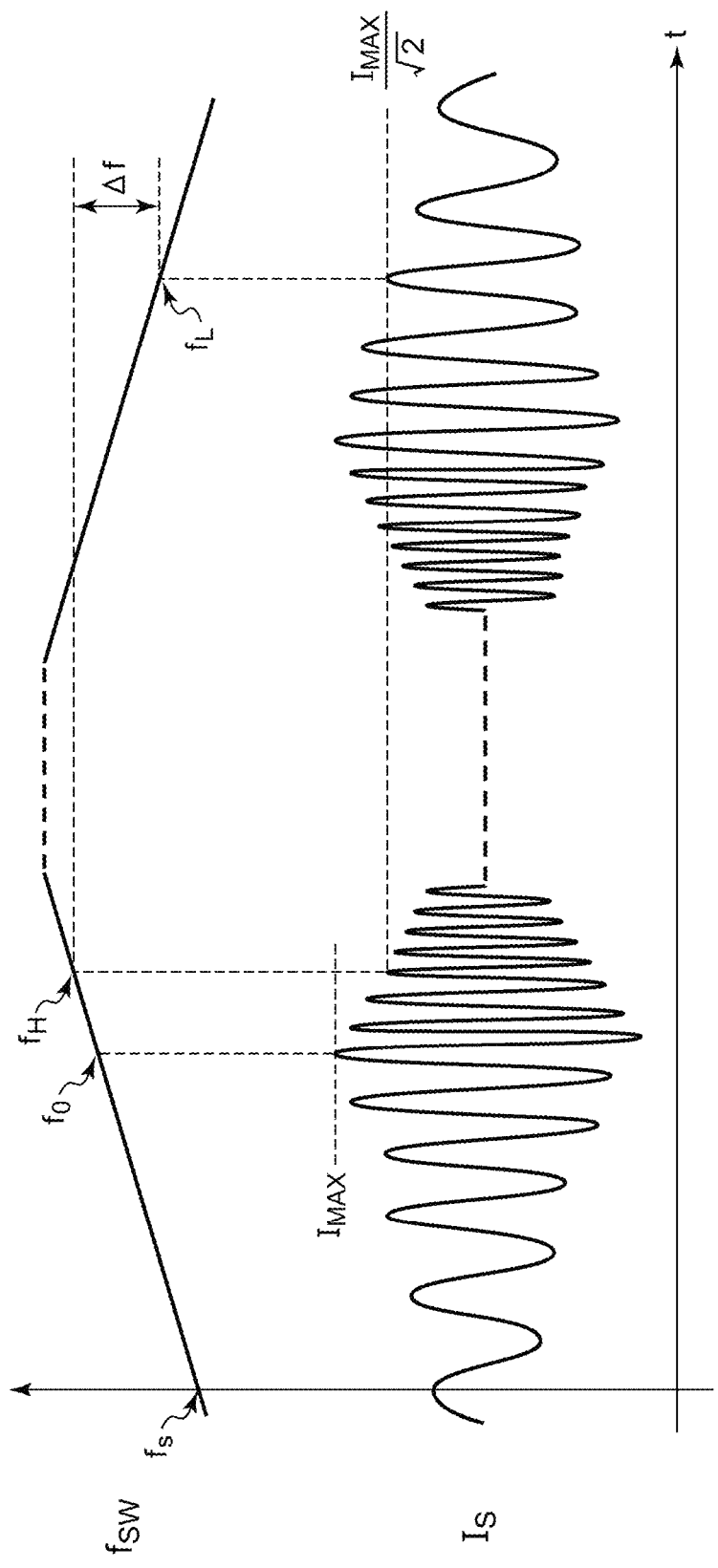
FIG. 6 is a waveform diagram illustrating the foreign object detection sequence of FIG. 5.

FIG. 6 is a waveform diagram illustrating the foreign object detection sequence of FIG. 5. When the switching frequency $f_{SW}$ is increased, the amplitude of the detection current $I_S$ increases. At a switching frequency $f_0$, the detection current $I_S$ reaches a peak $I_{MAX}$. When the switching frequency $f_{SW}$ is further increased, the detection current $I_S$ decreases and eventually decreases to $I_{MAX}/\sqrt{2}$. The switching frequency at this time is $f_H$. By sweeping down the switching frequency $f_{SW}$, another frequency $f_L$ at which $I_S = I_{MAX}/\sqrt{2}$ is satisfied is detected. The frequency difference $f_H - f_L$ is the bandwidth Δf.

Figure 7:
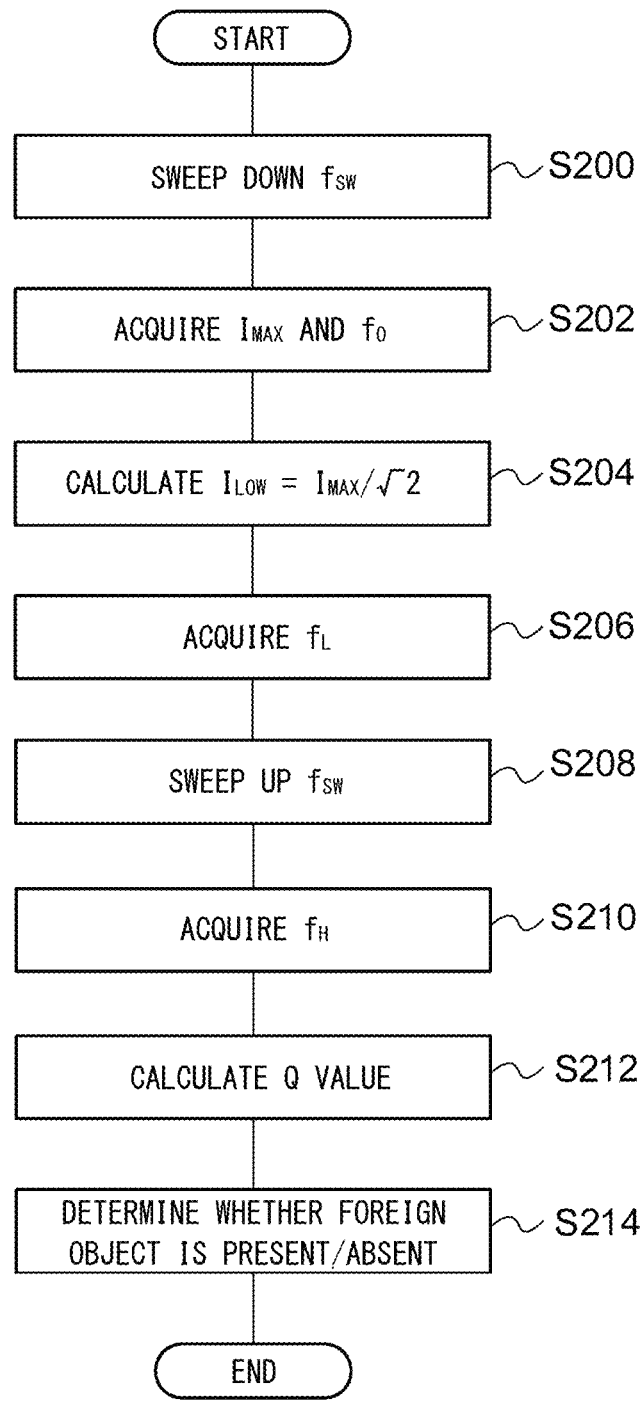
FIG. 7 is a flowchart illustrating another example of the foreign object detection sequence.

FIG. 7 is a flowchart illustrating another example of the foreign object detection sequence. The sequence of FIG. 7 is obtained by inverting the sweep direction of the sequence of FIG. 5. A predetermined frequency $f_S$ higher than the resonance frequency $f_R$ of the transmission antenna 201 is set as a start frequency, and the switching frequency $f_{SW}$ is swept down (S200).

In the sweep down process, the frequency $f_0$ and the current value $I_{MAX}$ at that time are acquired (S202). Subsequently, the current how is calculated by multiplying the peak current value $I_{MAX}$ by the predetermined ratio 1/√2 (S204). While the switching frequency $f_{SW}$ is further swept down, the frequency $f_L$ when the detected current $I_S$ reaches the current $I_{LOW}$ is acquired (S206).

Subsequently, the direction of the frequency sweep is switched to sweep up the switching frequency $f_{SW}$ (S208). Then, the frequency $f_H$ when the detection current $I_S$ reaches the current $I_{LOW}$ is acquired (S210). Then, the Q value is calculated from the three frequencies $f_0$, $f_H$, and $f_L$ (S212). The foreign object detector 230 determines whether a foreign object is present or absent based on the Q value thus obtained (S214).

Figure 8:
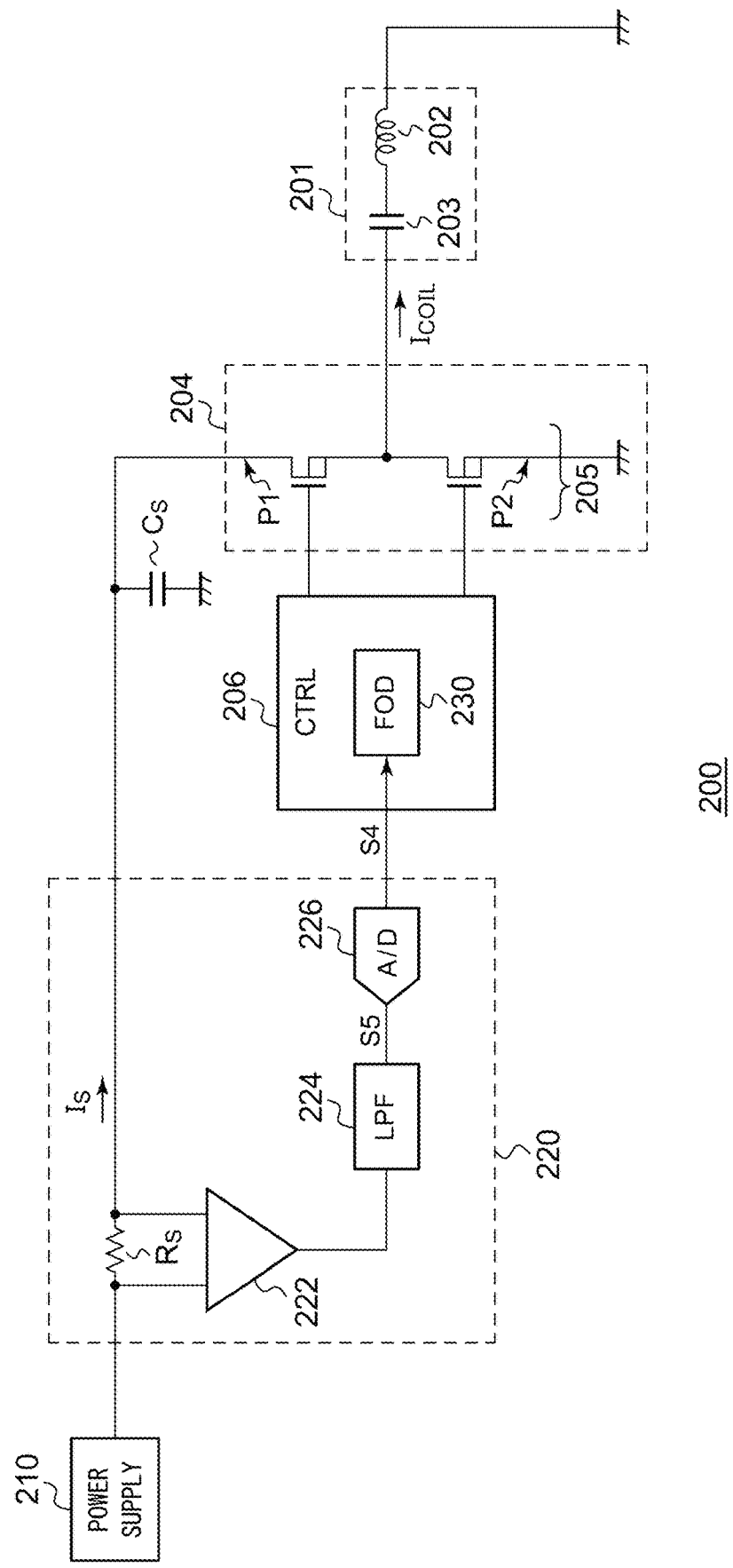
FIG. 8 is a circuit diagram illustrating a configuration example of a power transmitter.

Next, a specific configuration example of the power transmitter 200 will be described. FIG. 8 is a circuit diagram illustrating a configuration example of the power transmitter 200.

Current to be detected by the detection object of the current sensor 220 is the current $I_S$ flowing into the upper power supply terminal P1 of the bridge circuit 205 (referred to as input current) from the DC power supply 210. The current sensor 220 includes a detection resistor $R_S$ provided on the path of the current $I_S$ to be detected, a sense amplifier 222 that amplifies voltage drop Vs across the detection resistor $R_S$, a low-pass filter 224 that receives the output of the sense amplifier 222, and an A/D converter 226 that converts the output of the low-pass filter 224 to a digital value. The smoothing capacitor $C_S$ is coupled to the upper power supply terminal P1, and therefore it can be understood that the current sensor 220 measures the current $I_S$ flowing into the smoothing capacitor $C_S$. It is advantageous to set the input current $I_S$ as an object to be detected from the viewpoint of protection operation.

The power transmitter 200 often has a function of calculating its own transmission power, and the conventional power transmitter also includes a circuit to detect current for power calculation. In this case, the current detection circuit for power calculation can also be used as the current sensor 220.

Figure 9:
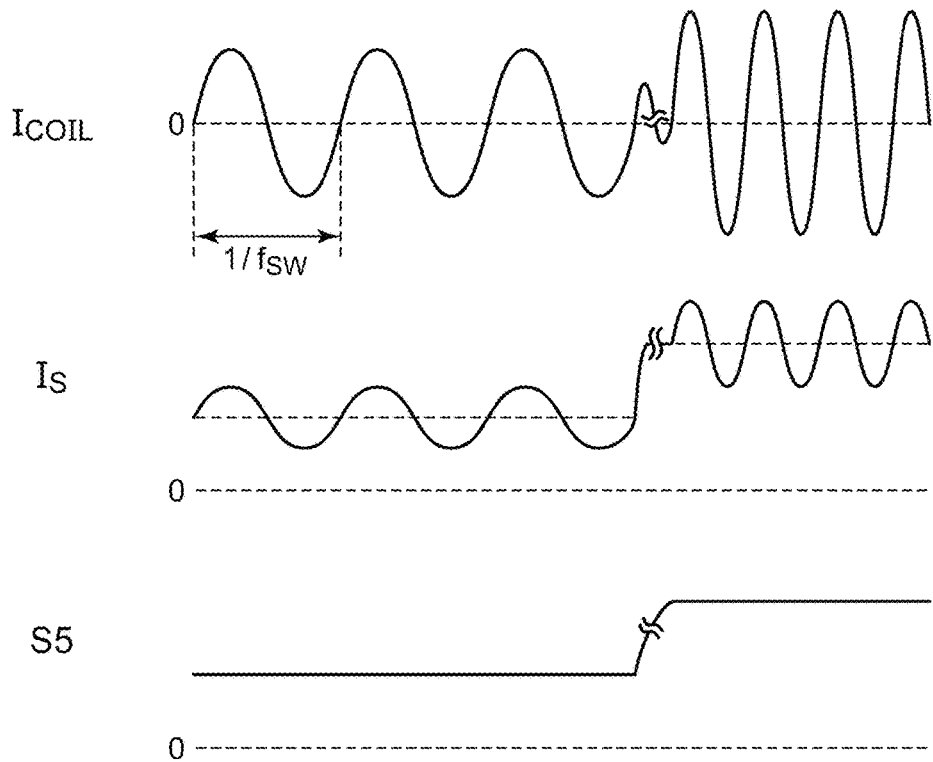
FIG. 9 is an operation waveform diagram of the power transmitter in FIG. 8.

FIG. 9 is an operation waveform diagram of the power transmitter 200 in FIG. 8. FIG. 9 illustrates the current $I_{COIL}$ flowing through the transmission antenna 201, the input current $I_S$ to the bridge circuit 205, and the output signal S5 of the low-pass filter 224.

In theory, the input current $I_S$ corresponds to the coil current $I_{COIL}$ during the period when the high-side transistor of the bridge circuit 205 is on, and thus the input current $I_S$ is a half-wave. However, since the smoothing capacitor $C_S$ is coupled to the upper power supply terminal P1 (the output of the DC power supply 210) of the bridge circuit 205, the input current $I_S$ is the sum of the DC component corresponding to the amplitude of the coil current $I_{COIL}$ and the AC (alternating current) component corresponding to the switching frequency $f_{SW}$. By removing the AC component corresponding to the switching frequency $f_{SW}$ by the low-pass filter 224, the DC component, that is, the coil current $I_{COIL}$ can be detected.

Figure 10:
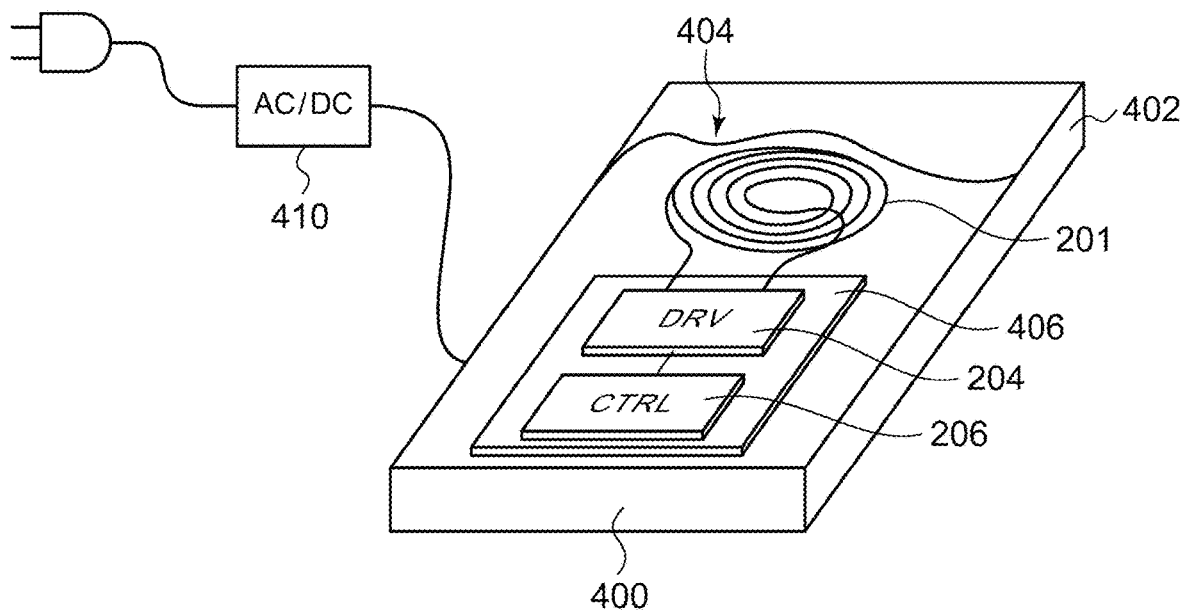
FIG. 10 is a circuit diagram of a charger including the power transmitter.

Next, the application of the power transmitter 200 will be described. FIG. 10 is a circuit diagram of a charger 400 including the power transmitter 200. The charger 400 charges an electronic device 500 including the power receiver 300. The charger 400 includes a housing 402, a charging stand 404, and a circuit board 406. The electronic device to be supplied with power is placed on the charging stand 404. The driver 204, the controller 206, and other circuit components are mounted on the circuit board 406. The transmission antenna 201 is laid out directly under the charging stand 404. The charger 400 may receive DC voltage by an AC/DC converter 410 or may have a built-in AC/DC. Alternatively, the charger 400 may be supplied with DC power from the outside via a bus having a power supply line such as Universal Serial Bus (USB).

It is to be understood by those skilled in the art that the embodiment is an example and that various modifications can be made to combinations of the components and the respective processing processes and that such modifications are also within the scope of the present invention. Hereinafter, such a modifications will be described.

First Modification

The current monitored by the current sensor 220 is not limited to the input current $I_S$ of the bridge circuit. For example, the detection resistor $R_S$ may be inserted on the ground side of the bridge circuit 205. However, when current is measured on the ground side, the effect of smoothing the current by the smoothing capacitor $C_S$ cannot be expected. Thus, an additional circuit and signal processing may be required in some cases. However, even in this case, the advantage of being able to simplify the circuit configuration and signal processing can be given as compared with the case where the output current of the bridge circuit 205 (that is, the coil current $I_{COIL}$) is measured.

Instead of inserting the detection resistor $R_S$, the on-resistance of the switching transistor (high-side transistor or low-side transistor) of the bridge circuit 205 may be used. However, when the on-resistance of the switching transistor is used, the internal current of the bridge circuit is measured, and thus the effect of smoothing the current by the smoothing capacitor $C_S$ cannot be expected, which may require an additional circuit and signal processing in some cases. However, even in this case, the advantage of being able to simplify the circuit configuration and signal processing can be given as compared with the case where the output current of the bridge circuit 205 (that is, the coil current $I_{COIL}$) is measured.

Second Modification

In the embodiment, the driver 204 of the half bridge circuit has been described, but the invention is also applicable to an H bridge circuit.

Third Modification

In the embodiment, the case where a foreign object is detected based on the Q value has been described, but the present invention is not limited thereto. In standards that will be formulated in the future other than the Qi standard, a foreign object can be detected based on change in the center frequency $f_0$, the bandwidth $\Delta f$, and a combination thereof rather than the Q value.

Fourth Modification

The power transmitter 200 may be structured to be switchable between an operation mode according to the sequences of FIG. 5 or FIG. 7 (first mode) and an operation mode described in the comparative technique (second mode). Selection of the operation mode may be based on parameters provided from a higher-level host processor to the controller 206 at the time of activation of the power transmitter 200. Alternatively, the power transmitter 200 may dynamically switch between the two modes. Normal power supply is hindered while executing the sequence of detecting a foreign object. Thus, if the power transmitter 200 is always operated in the first mode, time required for foreign object detection, that is, a period during which power supply is disabled becomes long. Therefore, by switching between the first mode and the second mode alternately or at a predetermined ratio, it is possible to balance the power supply disabled period and the accuracy of foreign object detection.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmitter structured to transmit a power signal to a wireless power receiver, comprising:
    a transmission antenna including a resonant capacitor and a transmitter coil coupled in series;
    a diver including a bridge circuit structured to apply a driving voltage to the transmission antenna;
    a current sensor structured to detect a current flowing through the bridge circuit; and
    a foreign object detector structured to detect the current flowing through the bridge circuit while changing switching frequency of the bridge circuit and determine whether a foreign object is present or absent based on a difference between two frequencies $f_H$ and $f_L$ giving current lower than a peak by a predetermined ratio, wherein
    the foreign object detector is structured to
    (i) acquire frequency $f_0$ at which the current peaks and a current value $I_{MAX}$ at that time while sweeping up the switching frequency of the bridge circuit from a frequency lower than a resonance frequency of the transmission antenna as a starting point,
    (ii) calculate current $I_{LOW}$ by multiplying the current value $I_{MAX}$ by a predetermined ratio, (iii) acquire frequency $f_H$ when the detected current reaches the current $I_{LOW}$ while further sweeping up the switching frequency, and
(iv) acquire the frequency $f_L$ at which the detected current reaches the current $I_{LOW}$ while sweeping down the switching frequency.

2. The wireless power transmitter according to claim 1, wherein the predetermined ratio is $1/\sqrt{2}$.

3. The wireless power transmitter according to claim 1, wherein the foreign object detector calculates a Q value according to $Q=f_0/(f_H-f_L)$, and determines whether a foreign object is present or absent based on the calculated Q value.

4. The wireless power transmitter according to claim 3, wherein the foreign object detector determines whether a foreign object is present or absent based on a comparison result between the calculated Q value and a predetermined threshold value.

5. The wireless power transmitter according to claim 4, wherein the foreign object detector receives the threshold value from the wireless power receiver.

6. The wireless power transmitter according to claim 1, wherein the current sensor is structured to detect the current flowing into an upper power supply terminal of the bridge circuit from a DC power supply.

7. The wireless power transmitter according to claim 6, further comprising a smoothing capacitor coupled to the upper power supply terminal of the bridge circuit.

8. The wireless power transmitter according to claim 1, wherein the current sensor includes:
a detection resistor provided on a path of current to be detected;
a sense amplifier structured to amplify voltage drop across the detection resistor;
a low-pass filter structured to receive an output of the sense amplifier, and
an A/D converter structured to convert an output of the low-pass filter to a digital value.

9. The wireless power transmitter according to claim 1, wherein a current detection circuit structured to detect current required to calculate transmission power is also used as the current sensor.

10. The wireless power transmitter according to claim 1, wherein the wireless power transmitter conforms to a Qi standard.

11. A wireless power transmitter structured to transmit a power signal to a wireless power receiver, comprising:
a transmission antenna including a resonant capacitor and a transmitter coil coupled in series;
a diver including a bridge circuit structured to apply a driving voltage to the transmission antenna;
a current sensor structured to detect a current flowing through the bridge circuit; and
a foreign object detector structured to detect the current flowing through the bridge circuit while changing switching frequency of the bridge circuit and determine whether a foreign object is present or absent based on a difference between two frequencies $f_H$ and $f_L$ giving current lower than a peak by a predetermined ratio, wherein
the foreign object detector is structured to
(i) acquire frequency $f_0$ at which the current peaks and a current value $I_{MAX}$ at that time while sweeping down the switching frequency of the bridge circuit from a frequency higher than a resonance frequency of the transmission antenna as a starting point,
(ii) calculate current $I_{LOW}$ by multiplying the current value $I_{MAX}$ by a predetermined ratio,
(iii) acquire frequency $f_L$ when the detected current reaches the current $I_{LOW}$ while further sweeping down the switching frequency, and
(iv) acquire the frequency $f_H$ at which the detected current reaches the current $I_{LOW}$ while sweeping up the switching frequency.

12. The wireless power transmitter according to claim 11, wherein the predetermined ratio is $1/\sqrt{2}$.

13. The wireless power transmitter according to claim 3, wherein the foreign object detector calculates a Q value according to $Q=f_0/(f_H-f_L)$, and determines whether a foreign object is present or absent based on the calculated Q value.

14. The wireless power transmitter according to claim 13, wherein the foreign object detector determines whether a foreign object is present or absent based on a comparison result between the calculated Q value and a predetermined threshold value.

15. The wireless power transmitter according to claim 3, wherein the current sensor is structured to detect the current flowing into an upper power supply terminal of the bridge circuit from a DC power supply.

16. The wireless power transmitter according to claim 15, further comprising a smoothing capacitor coupled to the upper power supply terminal of the bridge circuit.

17. The wireless power transmitter according to claim 3, wherein the current sensor includes:
a detection resistor provided on a path of current to be detected;
a sense amplifier structured to amplify voltage drop across the detection resistor;
a low-pass filter structured to receive an output of the sense amplifier, and
an A/D converter structured to convert an output of the low-pass filter to a digital value.

18. The wireless power transmitter according to claim 11, wherein a current detection circuit structured to detect current required to calculate transmission power is also used as the current sensor.

19. A foreign object detection method in a wireless power receiver including
a transmission antenna including a resonant capacitor and a transmitter coil coupled in series, and
a bridge circuit structured to apply a driving voltage to the transmission antenna, the foreign object detection method comprising:
detecting a current flowing through the bridge circuit while changing switching frequency of the bridge circuit; and
determining whether a foreign object is present or absent based on a difference between two frequencies $f_H$ and $f_L$ giving current lower than a peak by a predetermined ratio, wherein the determining includes
(i) acquire frequency $f_0$ at which the current peaks and a current value $I_{MAX}$ at that time while sweeping down the switching frequency of the bridge circuit from a frequency lower than a resonance frequency of the transmission antenna as a starting point,
(ii) calculate current $I_{LOW}$ by multiplying the current value $I_{MAX}$ by a predetermined ratio,
(iii) acquire frequency $f_H$ when the detected current reaches the current $I_{LOW}$ while further sweeping down the switching frequency, and
(iv) acquire the frequency $f_L$ at which the detected current reaches the current $I_{LOW}$ while sweeping up the switching frequency.

20. A foreign object detection method in a wireless power receiver including a transmission antenna including a resonant capacitor and a transmitter coil coupled in series, and a bridge circuit structured to apply a driving voltage to the transmission antenna, the foreign object detection method comprising:

detecting a current flowing through the bridge circuit while changing switching frequency of the bridge circuit; and determining whether a foreign object is present or absent based on a difference between two frequencies $f_H$ and $f_L$ giving current lower than a peak by a predetermined ratio, wherein the determining includes (i) acquiring frequency $f_0$ at which the current peaks and a current value $I_{MAX}$ at that time while sweeping down the switching frequency of the bridge circuit from a frequency higher than a resonance frequency of the transmission antenna as a starting point, (ii) calculating current $I_{LOW}$ by multiplying the current value $I_{MAX}$ by a predetermined ratio, (iii) acquiring frequency $f_L$ when the detected current reaches the current $I_{LOW}$ while further sweeping down the switching frequency, and (iv) acquiring the frequency $f_H$ at which the detected current reaches the current $I_{LOW}$ while sweeping up the switching frequency.

* * * * *